(12) United States Patent
Nagaraja

(10) Patent No.: US 8,973,036 B2
(45) Date of Patent: Mar. 3, 2015

(54) MAPPING MOBILE DEVICE ELECTRONIC PROGRAM GUIDE TO CONTENT

(75) Inventor: Nagendra Nagaraja, Vidyaranyapura (IN)

(73) Assignee: QUALCOMM Incorporated, San Diego, CA (US)

( * ) Notice: Subject to any disclaimer, the term of this patent is extended or adjusted under 35 U.S.C. 154(b) by 979 days.

(21) Appl. No.: 11/949,862

(22) Filed: Dec. 4, 2007

(65) Prior Publication Data
US 2009/0144768 A1 Jun. 4, 2009

(51) Int. Cl.
*H04N 5/445* (2011.01)
*H04N 7/173* (2011.01)
*H04N 21/222* (2011.01)
(Continued)

(52) U.S. Cl.
CPC ....... *H04N 5/44543* (2013.01); *H04N 7/17318* (2013.01); *H04N 21/222* (2013.01); *H04N 21/235* (2013.01); *H04N 21/26283* (2013.01); *H04N 21/2665* (2013.01); *H04N 21/41407* (2013.01); *H04N 21/435* (2013.01); *H04N 21/4532* (2013.01); *H04N 21/4622* (2013.01); *H04N 21/47202* (2013.01); *H04N 21/4782* (2013.01); *H04N 21/4788* (2013.01); *H04N 21/482* (2013.01); *H04N 21/84* (2013.01); *H04N 21/8586* (2013.01)
USPC ................... 725/39; 725/44; 725/45; 725/47; 725/48

(58) Field of Classification Search
CPC .................... H04N 21/23109; H04N 21/2665; H04N 21/4332; H04N 21/462; H04N 21/4622; H04N 21/4756
USPC .............................. 725/39, 44–48, 53, 58–59
See application file for complete search history.

(56) References Cited

U.S. PATENT DOCUMENTS 6,437,836 B1 8/2002 Huang et al.
7,103,905 B2 * 9/2006 Novak ............................ 725/46
(Continued)

FOREIGN PATENT DOCUMENTS

CN 1794235 A 6/2006
EP 1628476 A2 2/2006
(Continued)

OTHER PUBLICATIONS

S. Ferretti et al., "Web Content Search and Adaptation for IDTV: One Step Forward in the Mediamorphosis Process toward Personal-TV", Advances in Multimedia, 2007, 13 pages, vol. 2007, Article ID 16296, Hindawi Publishing Corporation.
(Continued)

*Primary Examiner* — Gigi L Dubasky
(74) *Attorney, Agent, or Firm* — Timothe E. Buckley; Elaine H. Lo

(57) ABSTRACT

A user computing device, such as mobile device, is provided with an electronic program guide (EPG). The EPG lists video content that is available or being broadcast on one or more websites. The video content may be considered to be premium content or user content. Premium content may be video content that is available from the website of a commercial broadcaster. Premium content may be generated by the commercial broadcaster. User content may be video content that has been generated and provided to websites for viewing and sharing by users such as members of the websites. An EPG may display listings of both user content and premium content.

46 Claims, 10 Drawing Sheets

|  | Most Viewed | Highest Rated | Recently Posted |
|---|---|---|---|
| YouTube | Ask A Ninja | Fun Meals | Million Dollar Car |
| YouTube | Go Green | Gardening | Sameness |
| YouTube | Telephony | Elephant | French Toast |
| Yahoo! Video | Moving Rainbow | Moving Rainbow | Haircut |
| Yahoo! Video | My Current Life | Little Dog | Recycle Computer |

(51) Int. Cl.

| | |
|---|---|
| H04N 21/235 | (2011.01) |
| H04N 21/262 | (2011.01) |
| H04N 21/2665 | (2011.01) |
| H04N 21/414 | (2011.01) |
| H04N 21/435 | (2011.01) |
| H04N 21/45 | (2011.01) |
| H04N 21/462 | (2011.01) |
| H04N 21/472 | (2011.01) |
| H04N 21/4782 | (2011.01) |
| H04N 21/4788 | (2011.01) |
| H04N 21/482 | (2011.01) |
| H04N 21/84 | (2011.01) |
| H04N 21/858 | (2011.01) |

(56) References Cited

U.S. PATENT DOCUMENTS

| | | | |
|---|---|---|---|
| 2003/0023757 | A1 | 1/2003 | Ishioka et al. |
| 2003/0221198 | A1* | 11/2003 | Sloo ............... 725/136 |
| 2004/0078807 | A1* | 4/2004 | Fries et al. ............... 725/14 |
| 2006/0019608 | A1 | 1/2006 | Furuumi et al. |
| 2006/0019618 | A1* | 1/2006 | Seppala ............... 455/121 |
| 2006/0123448 | A1* | 6/2006 | Ma et al. ............... 725/51 |
| 2006/0136383 | A1 | 6/2006 | Golla |
| 2006/0212906 | A1 | 9/2006 | Cantalini |
| 2007/0143493 | A1* | 6/2007 | Mullig et al. ............... 709/232 |
| 2007/0143794 | A1 | 6/2007 | Negi |
| 2007/0186243 | A1* | 8/2007 | Pettit et al. ............... 725/46 |
| 2007/0234389 | A1 | 10/2007 | Tsukamoto |
| 2008/0086747 | A1* | 4/2008 | Rasanen et al. ............... 725/46 |
| 2010/0064320 | A1* | 3/2010 | Angiolillo et al. ............... 725/46 |
| 2010/0121983 | A1* | 5/2010 | Carden ............... 709/246 |

FOREIGN PATENT DOCUMENTS

| | | |
|---|---|---|
| JP | 2001186497 A | 7/2001 |
| JP | 2001218188 A | 8/2001 |
| JP | 2002531895 A | 9/2002 |
| JP | 2002538735 A | 11/2002 |
| JP | 2003032660 A | 1/2003 |
| JP | 2003515983 A | 5/2003 |
| JP | 2004525576 A | 8/2004 |
| JP | 2006054818 A | 2/2006 |
| JP | 2007013896 A | 1/2007 |
| JP | 2007037070 A | 2/2007 |
| JP | 2007150764 A | 6/2007 |
| JP | 2007166363 A | 6/2007 |
| JP | 2007172092 A | 7/2007 |
| JP | 2007281602 A | 10/2007 |
| WO | 0033224 A1 | 6/2000 |
| WO | 0052927 A1 | 9/2000 |
| WO | 0139494 A1 | 5/2001 |
| WO | 2006008593 A1 | 1/2006 |
| WO | 2007054687 A1 | 5/2007 |
| WO | WO2007103700 | 9/2007 |
| WO | 2008135912 A1 | 11/2008 |

OTHER PUBLICATIONS

M. Kornfeld et al., "DVB-H and IP Datacast—Broadcast to Handheld Devices", IEEE Transactions on Broadcasting, Mar. 2007, pp. 161-170, vol. 53, No. 1.

"FLO Technology Overview", Qualcomm Incorporated, 2007, 24 pages, www.qualcomm.com/mediaflo.

International Search Report and Written Opinion—PCT/US2008/084879, International Search Authority—European Patent Office—Feb. 13, 2009.

Partial European Search Report—EP08006535, Search Authority—Munich Patent Office, Feb. 9, 2009.

Taiwan Search Report—TW097147207—TIPO—Mar. 13, 2012.

\* cited by examiner

|  | Most Viewed | Highest Rated | Recently Posted |
|---|---|---|---|
| YouTube | Ask A Ninja | Fun Meals | Million Dollar Car |
| YouTube | Go Green | Gardening | Sameness |
| YouTube | Telephony | Elephant | French Toast |
| Yahoo! Video | Moving Rainbow | Moving Rainbow | Haircut |
| Yahoo! Video | My Current Life | Little Dog | Recycle Computer |

FIG. 3

MAPPING MOBILE DEVICE ELECTRONIC PROGRAM GUIDE TO CONTENT

FIELD

The following description relates generally to mobile devices and more particularly to mapping mobile device electronic program guides (EPGs) to content.

BACKGROUND

Many websites of the World Wide Web (the "web") contain video content. The video content may be posted on the website by the website provider, an entity associated with the website provider, or a user of the website. Some websites generate or procure their own video content and allow users of the website to download and/or view the video content. Some websites allow users of the website to upload video content which may then be accessed by other users of the website.

Some mobile devices, such as mobile phones, allow users to access the web. A user may access a website and select video content for downloading or viewing on their mobile device. The video content on a website that is available for downloading or viewing may be categorized or ranked. Categories may be directed to type of video content, such as entertainment or sports, and ranking may be directed to how many times the video content has been downloaded or viewed.

SUMMARY

In an implementation, a user computing device, such as mobile device, is provided with an electronic program guide (EPG). The EPG lists video content that is available or being broadcast on one or more websites. The video content may be considered to be premium content or user content. Premium content may be video content that is available from the website of a commercial broadcaster. Premium content may be generated by the commercial broadcaster. User content may be video content that has been generated and provided to websites for viewing and sharing by users such as members of the websites. An EPG may display listings of both user content and premium content.

In an implementation, websites may store, host, or otherwise provide access to video content along with information pertaining to the video content such as video tags, categories, etc. One or more agents may retrieve video content and video content information from the websites. The agent(s) may send the video content and video content information to one or more broadcasters for delivery to a user computing device. The video content information may be mapped to an EPG associated with the user computing device. At some point, the broadcaster may also send the video content to the user computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings:

FIG. 3 shows an exemplary screen display of an EPG that lists video content from multiple websites that has been viewed most often by other users of the websites;

DETAILED DESCRIPTION

A mobile device, such as a mobile phone or mobile television, is provided with an electronic program guide (EPG). The EPG lists video content that is available or being broadcast on one or more websites. A wide variety of video content may be present on the websites, such as movie clips, television clips, and music videos, as well as amateur content such as videoblogging and short original videos. The video content may be stored and viewed on the mobile device.

The video content may be considered to be premium content or user content. Premium content may be video content that is available over a network such as the Internet from the website of a commercial broadcaster, such as CNN, ABC News, or The New York Times, for example. Premium content may be generated by the commercial broadcaster. User content, on the other hand, may be video content that has been generated and provided to websites for viewing and sharing by users such as members of the websites. For example, YouTube and Yahoo! Video are websites that host user content. Some websites may contain both premium content and user content.

An EPG, which also may be referred to as an interactive program guide (IPG) or electronic service guide (ESG), is an on-screen guide to scheduled or available video content, allowing a user to navigate, select, and discover video content by time, title, channel, category, genre, etc., by use of their mobile device keypad or other device such as a remote control or a keyboard. A user may navigate through the EPG by moving a cursor, for example. An EPG may be displayed on a mobile device or other device having a screen such as a stationary monitor or television, for example.

Figure 1:
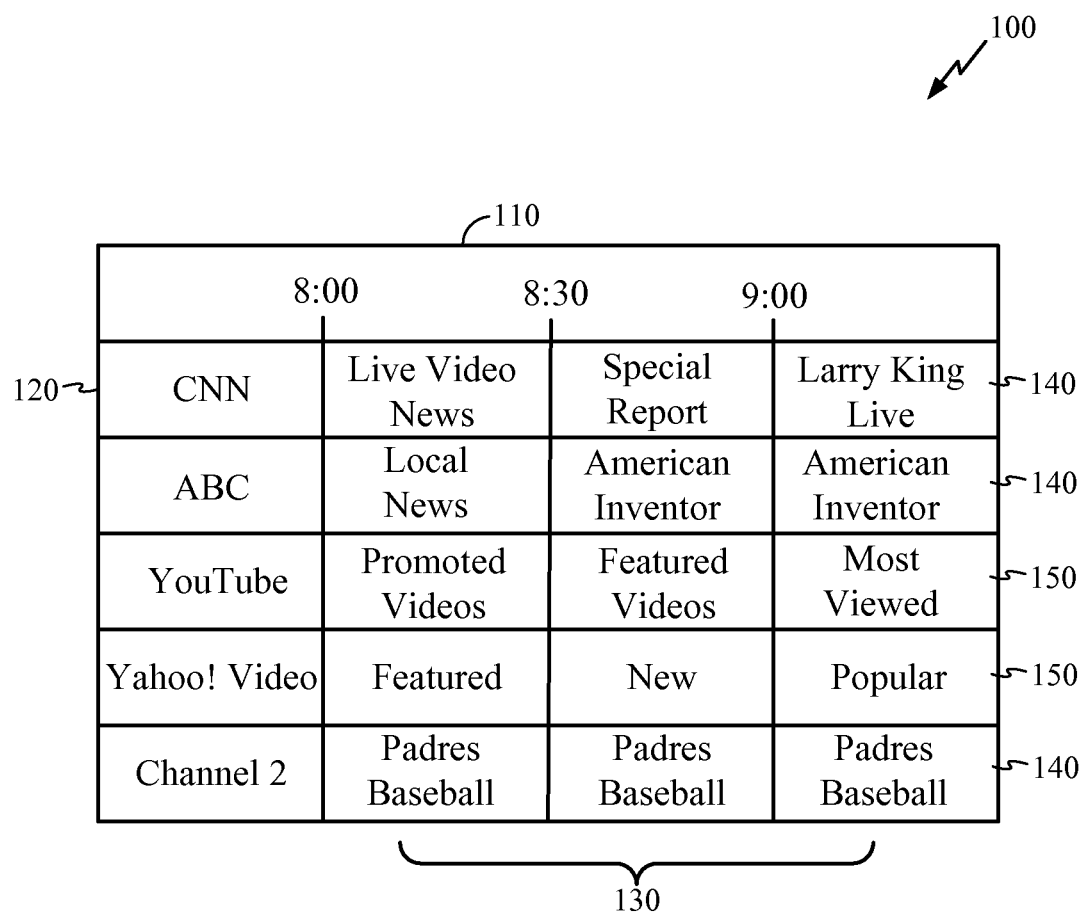
FIG. 1 shows an exemplary screen display of an EPG for scheduled broadcasts from multiple websites.

An EPG may display listings of video content that is available on one or more channels or websites. In an implementation, the listings may be arranged in a grid. FIG. 1 shows an exemplary screen display of an EPG 100 for scheduled broadcasts from multiple websites. As shown, each column 110 of the grid may represent a particular time slot, such as 8:00 p.m. to 8:30 p.m., and each row 120 may represent a particular website channel such as channel 2, and/or a particular website, such as ABC, CNN, YouTube, or Yahoo! Video. The various scheduled programs may be arranged within the rows and columns, indicating the channels and times at which they may be found. Any number of rows and columns may be provided.

A user may scroll as desired both horizontally and vertically through the grid. The EPG may display listings 130 of both premium content 140 and user content 150. The listings may contain a title of the video content, a description of the video content, an image associated with the video content, and/or a video clip of the video content, for example. However, any other data associated with the video content may be provided in the listings or accessible via the listings such as by moving a cursor over the listing or clicking on the listing, for example.

The EPG may display listings of video content that is available from multiple websites, with each website providing user content, premium content, or both. Thus, the availability of premium content and user content may be converged and their listings may be provided to an EPG. In an implementation, the EPG may display listings of video content from a website that provides both user content and premium content.

A user may input user-selection criteria to direct the EPG to display only available video content that meet the criteria. For example, the user may select a category such as "sports" or "comedy", and the EPG may then display only the listings for video content in the selected category. The user may be presented with buttons, selectors, or a text input box, for example, that the user may use to indicate the user-selection criteria.

Figure 2:
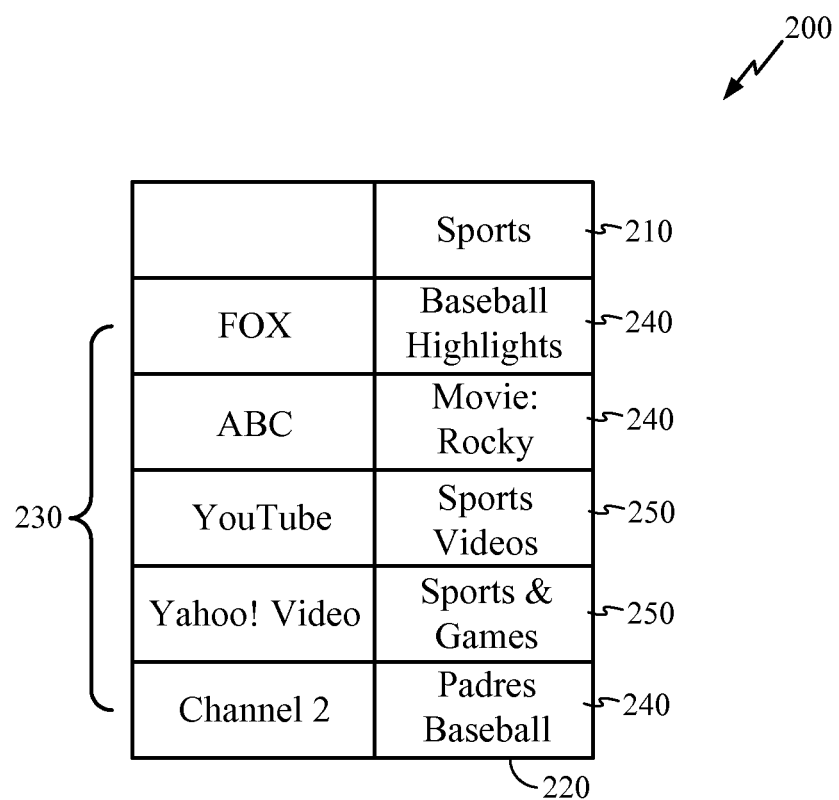
FIG. 2 shows an exemplary screen display of an EPG for a selected category that lists video content from multiple websites.

FIG. 2 shows an exemplary screen display of an EPG 200 for a selected category 210, "sports", that lists video content 220 from multiple websites 230. Depending on the implementation, the listings may be for video content that is presently being broadcast, may be broadcast in the future, and/or may be available for viewing and/or storing when the user desires. The listings may be for one or more websites 230, and may be for premium content 240, user content 250, or both. As described further herein, the video content may be categorized by the website that is providing the video content for viewing, or by the user who provided the video to the website.

Additional user-selection criteria may be based on other users' interactions with the video content, such as how often the video content has been viewed by other users or how high the video content has been rated by other users, for example, or other features of the video content such as when it was posted on a website, for example. In an implementation, a user may input user-selection criteria directed to video content that has been viewed most often by other users, video content that has been rated highest, or video content that has most recently been posted.

FIG. 3 shows an exemplary screen display of an EPG 300 that lists video content from multiple websites 330 that has been viewed most often 310 by other users of the websites. Depending on the implementation, the listings 320 may be for one or more websites, and may be for premium content, user content, or both. As shown in FIG. 3, the most viewed content 310 lists user content for two websites YouTube and Yahoo! Video. Additionally or alternatively, the EPG 300 may list video content having the highest rating 312 by other users of the website and/or video content that has been recently posted 314, for example. The examples shown are not intended to be limiting, and other user-selection criteria directed to user interactions with the video content and other features of the video content are contemplated.

A user may combine user-selection criteria to create video content listings on the EPG that are more focused on the user's preferences. For example, a user may combine "sports", "comedy", and "highest rated" to view listings of the highest rated video content directed to sports and comedy. Any combination of time, genre, category, type of video content, other users' interactions with the video content, websites, and channels may be selected by a user, and listings based on the selected combination may be generated and displayed in the EPG.

In an implementation, the EPG may display listings of video content from a single website, such as a website that displays user content or a website that provides premium content. The EPG may be mapped to one or more of the video categories that is provided by the website, such as, for example, "Autos", "Comedy", "Entertainment", "Film & Animation", "Gadgets & Games", "Howto & DIY", "Music, News & Politics", "People & Blogs", "Pets & Animals", "Sports", "Travel & Places", etc. Listings directed to video content in the particular video category or categories that are being mapped to may be shown in the EPG.

The video content on a website that is available for download and/or viewing on a user computer device, such as a mobile device, may have one or more associated video tags. A video tag may be a keyword or term associated with or assigned to video content that describes the video content and enables keyword-based classification of the video content. Video content from the web or a particular website may be broadcast to users according to the video tags.

Thus, a video tag may be a description of the video content, such as a one or two word description of the video content. More than one video tag may be associated with a video. For example, a video directed to the San Diego Zoo may have associated video tags such as "San Diego", "zoo", "animals", "travel", and "places". In an implementation, a user who provides the video content to a website may also provide the video tag(s). Additionally or alternatively, a website may provide the video tag(s) for the video content. Website provided video tags may include such words as "most viewed", "highest rated", and "most recent", for example. As described further herein, the video tags may be used to populate an EPG by mapping the video tags onto the EPG.

Figure 4:
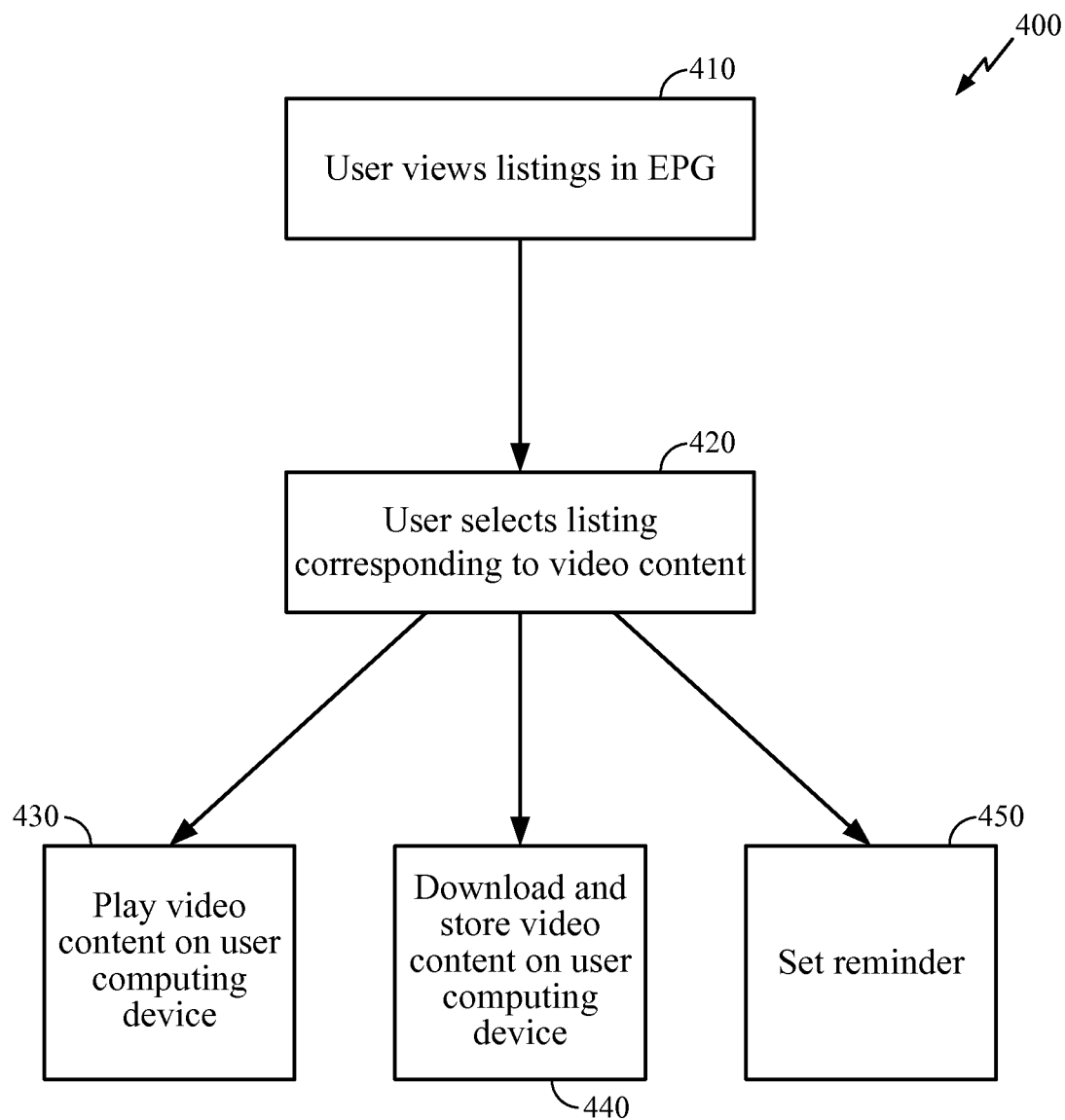
FIG. 4 is an operational flow of an implementation of a method that may be used to select a video content listing in an EPG.

FIG. 4 is an operational flow of an implementation of a method 400 that may be used to select a video content listing in an EPG displayed on a user computing device such as a mobile device. A user may scroll or otherwise navigate through the listings in the EPG at operation 410 by moving a cursor over the grid of the EPG using the keypad on the mobile device for example. The user may select a listing corresponding to video content at operation 420. In an implementation, selection may be made by highlighting the listing and/or clicking on the desired video content listing.

The user may view the video content corresponding to the listing at operation 430 and/or download and store the video content on the user computing device at operation 440. The user may view the video without storing it. The user may request the downloading and storing of video content through the EPG, which is similar to downloading the video content from the web. Viewing, downloading, and storage may be performed in the present time or at a future time. Thus, the user may download and save videos for offline viewing or editing, for example. Additionally, at operation 450, the user may set a reminder to alert the user to the video content at a later time (e.g., when the video content is being broadcast, when the user is available to view the video content, etc.).

The video content may be received and/or viewed through Internet protocol (IP) multicast, using broadcast access technology such as Qualcomm's MediaFLO technology, digital video broadcasting—handheld (DVB-H), digital multimedia broadcasting (DMB), integrated services digital broadcasting—terrestrial (ISDB-T). IP multicast is a method of forwarding IP datagrams to a group of interested receivers, and may be used to deliver one-way streaming media, such as high-speed video to large groups of receivers. Third generation multimedia broadcast and multicast service (3G MBMS) or platinum broadcast may also be used as a broadcast access technology.

MediaFLO broadcasts data to mobile devices. Data that may be broadcasted include multiple realtime audio and video streams, and individual, non-realtime video and audio clips, for example. MediaFLO may be forward link only, meaning that the data transmission path is one-way, from a broadcast system to a mobile device. The MediaFLO system transmits data on a frequency separate from the frequencies used by current cellular networks.

DVB-H is a technical specification for bringing broadcast services to handheld receivers. A major competitor of this technology is DMB. DMB is a digital radio transmission system for sending multimedia to mobile devices such as mobile phones. ISDB-T is a digital television and digital radio format that allows radio and television stations to convert to digital.

3G MBMS is a broadcasting service that can be offered via existing cellular networks. The infrastructure offers an option to use an uplink channel for interaction between the service and the user. 3G MBMS uses multicast distribution in the core network instead of point-to-point links for each end device. Platinum broadcast is a broadcast technology that is supported by CDMA2000, which is a hybrid 2.5G/3G protocol of mobile telecommunications standards that use code division multiple access (CDMA), a multiple access scheme for digital radio, to send voice, data, and signaling data (such as a dialed telephone number) between mobile phones and cell sites.

MediaFLO, DVB-H, DMB, ISDB-T, 3G MBMS, and platinum broadcast are merely examples of multimedia broadcast systems that may be used with the examples described herein, and other functionally equivalent multimedia broadcast systems are contemplated as well.

Figure 5:
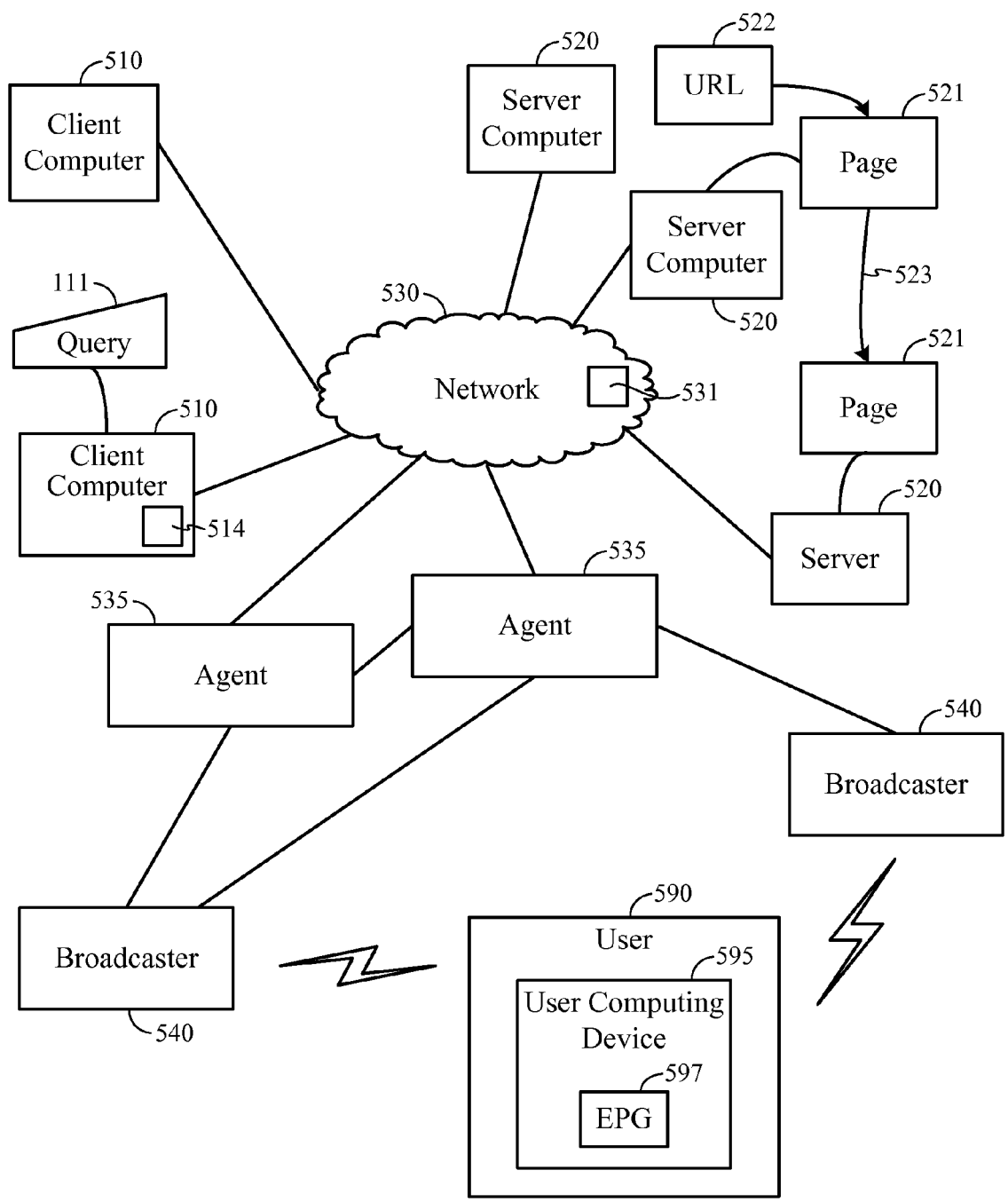
FIG. 5 is a block diagram of an implementation of an environment in which a user computing device with an EPG may operate.

FIG. 5 is a block diagram of an implementation of an environment 500 in which a user computing device with an EPG may operate. The environment includes client computers 510 and server computers 520 (generally "hosts") connected to each other by a network 530, for example, the Internet, a wide area network (WAN) or local area network (LAN). The network 530 provides access to services such as the web 531. The web 531 allows the client computers 510 to access documents containing text-based or multimedia content contained in, e.g., pages 521 (e.g., web pages or other documents) maintained and served by the server computers 520. Typically, this is done with a web browser application program 514 executing in the client 510. The location of each page 521 may be indicated by an associated uniform resource locator (URL) 522 that is entered into the web browser application program 514 to access the page 521. Many of the pages may include hyperlinks 523 to other pages 521. The hyperlinks may be in the form of URLs. Although the implementation is described with respect to documents that are pages, it should be understood that the environment can include any linked data objects having content and connectivity that can be characterized.

One or more websites on the web 531 may store, host, or otherwise provide access to video content along with information pertaining to the video content such as video tags, categories, etc. One or more agents 535 may retrieve video content and video content information from the websites. An agent may be an application, a search engine, etc.

The agent(s) 535 may send the video content and video content information to one or more broadcasters 540 via any known communication technique. In an implementation, IP multicast or any known broadcast technology may be used to connect an agent and a broadcaster. An agent may be owned by, or associated with, a broadcaster or a website. For example, an agent may be a program running on a server associated with a broadcaster.

In an implementation, an agent may be an intelligent program which aggregates the video tags on the web 531 and provides it to the broadcaster(s) 540 for delivery to a user computing device 595 associated with a user 590. The video content information may be mapped to the EPG 597 associated with the user computing device 595. Additionally or alternatively, the agent may aggregate video tag updates or changes and provide that information to the broadcaster(s) 540. At some point, the broadcaster may also send the video content to the user computing device 595.

Although only two agents 535 and two broadcasters 540 are shown in FIG. 5, it is contemplated that any number of agents and broadcasters may be associated with the environment 500. Additionally, any number of users and user computing devices may be associated with the environment 500.

The user computing device 595 may be a mobile device such as a mobile phone and may be able to generate and display the EPG 597, such as the EPGs described herein. The EPG may be updated from time to time as described further herein. An example user computing device 595 is described with respect to FIG. 10.

Agents 535 may be deployed at multiple locations and may be connected with each other by an IP multicast group. An agent may have one or more filters to video content information, such as global and local content filters to distinguish global content from local content. This may allow for local video content and its information to be retrieved and provided to the broadcaster(s) 540, along with or instead of, national and/or global video content and its information.

A broadcaster may receive and aggregate the various video content information from the one or more agents 535. For example, a broadcaster may receive and aggregate local content information from one agent acting locally along with national and/or global content information from another agent acting nationally and/or globally. Thus, in an implementation, a broadcaster may be able to receive and provide video content that is highest rated or most viewed nationally and/or globally as well as video content that is highest rated or most viewed in a particular local or smaller area, such as a city, state, or region such as the east coast or the west coast. The video content for the national or global area may be different than the video content for the particular local or smaller area. A broadcaster may also be able to receive and provide video content that may be relevant to a local population, such as local news, sports, and weather, as well as different video content that may be relevant to a national or global audience. Thus, in an implementation, an EPG may provide a blend of local and national and/or global video content. A user may access local video content as they move from one area to another area.

The video content information may be mapped to an EPG by the broadcaster and broadcast to one or more user computing devices 595. The criteria to categorize video may be different for different broadcasters, if multiple broadcasters are enabled. A broadcaster may classify video content from different websites and broadcast it to the user.

In an implementation, each video category may be mapped to an EPG and may be displayed on the EPG according to the individual video categories. The video content information may be broadcast by short message service (SMS) or file delivery over unidirectional transport (FLUTE) protocol, for example, although any appropriate broadcast technique may be used. In an implementation, there may be multiple simultaneous tag streams on the network which may be mapped to an EPG that a user can navigate. The user may access the tag-based video content streaming one at a time using the EPG. Multiple video decoding may be supported. Video may be sent sequentially according to the video tag.

Multiple streams of multicast video content may be supported through the EPG. This may be performed by decoding different video content from different channels of a website onto different parts of the EPG.

As noted above, the video content may be IP multicast video and may be mapped to the EPG according to its video category. The IP multicast video may be provided to the user computing device. Web server bandwidth may be reduced because of the use of IP multicasting of the video content. A push strategy may be used on the video content to an intermediate node associated with the broadcaster, for example, which may handle the IP multicast group address. The user may be added to the multicast group address when the user selects particular video content through the EPG.

Figure 6:
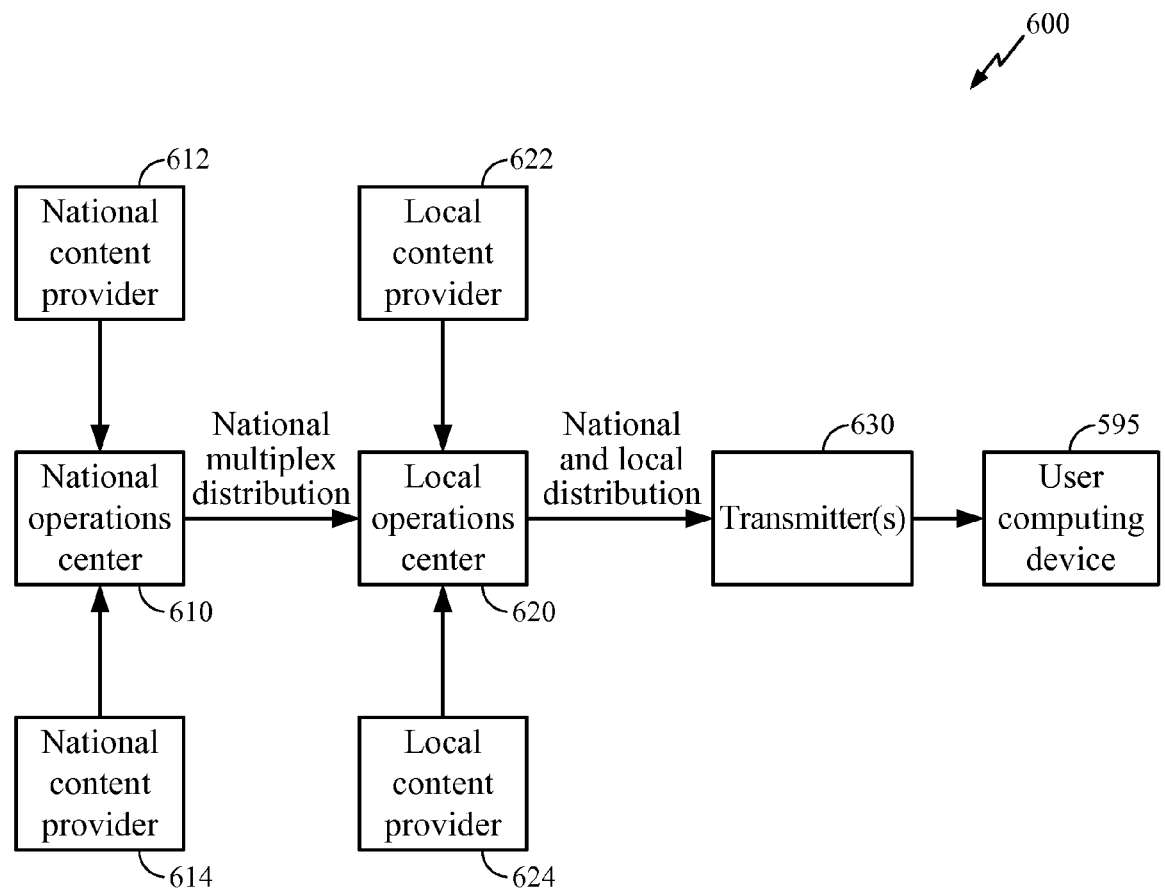
FIG. 6 is a block diagram of another implementation of an environment in which a user computing device with an EPG may operate.

FIG. 6 is a block diagram of another implementation of an environment 600 in which a user computing device with an EPG may operate. One or more national content providers 612, 614 may provide video content to a national operations center 610. The video content may be provided to the national operations center 610 using any transmission technique or system, such as the Internet, satellite, etc. One or more agents may operate in conjunction with the national content providers 612, 614 to provide video content and associated video content information to the national operations center 610. Although only two national content providers are shown, it is contemplated that any number of national content providers may be in communication with the national operations center 610. In an implementation, the video content provided by the national content providers 612, 614 may be national, international, or global in nature.

Similarly, one or more local content providers 622, 624 may provide video content to a local operations center 620. The video content provided by the local content providers 622, 624 may be local in nature (e.g., local news, weather, sports, etc.) and may be provided to the local operations center 620 using any transmission technique or system. Similar to that described above, one or more agents may operate in conjunction with the local content providers 622, 624 to provide video content and associated video content information to the local operations center 620. Although only two local content providers are shown, it is contemplated that any number of local content providers may be in communication with the local operations center 620.

The national content received at the national operations center 610 may be multiplexed, for example, and distributed to one or more local operations centers. Although only one national operations center and one local operations center is shown, any number may be implemented. The local operations center 620 may receive the national content and send the national content along with the local content received from the local content providers 622, 624 to one or more transmitter(s) 630 for transmission to the user computing device 595. In this manner, the user computing device may receive both local and national video content.

Figure 7:
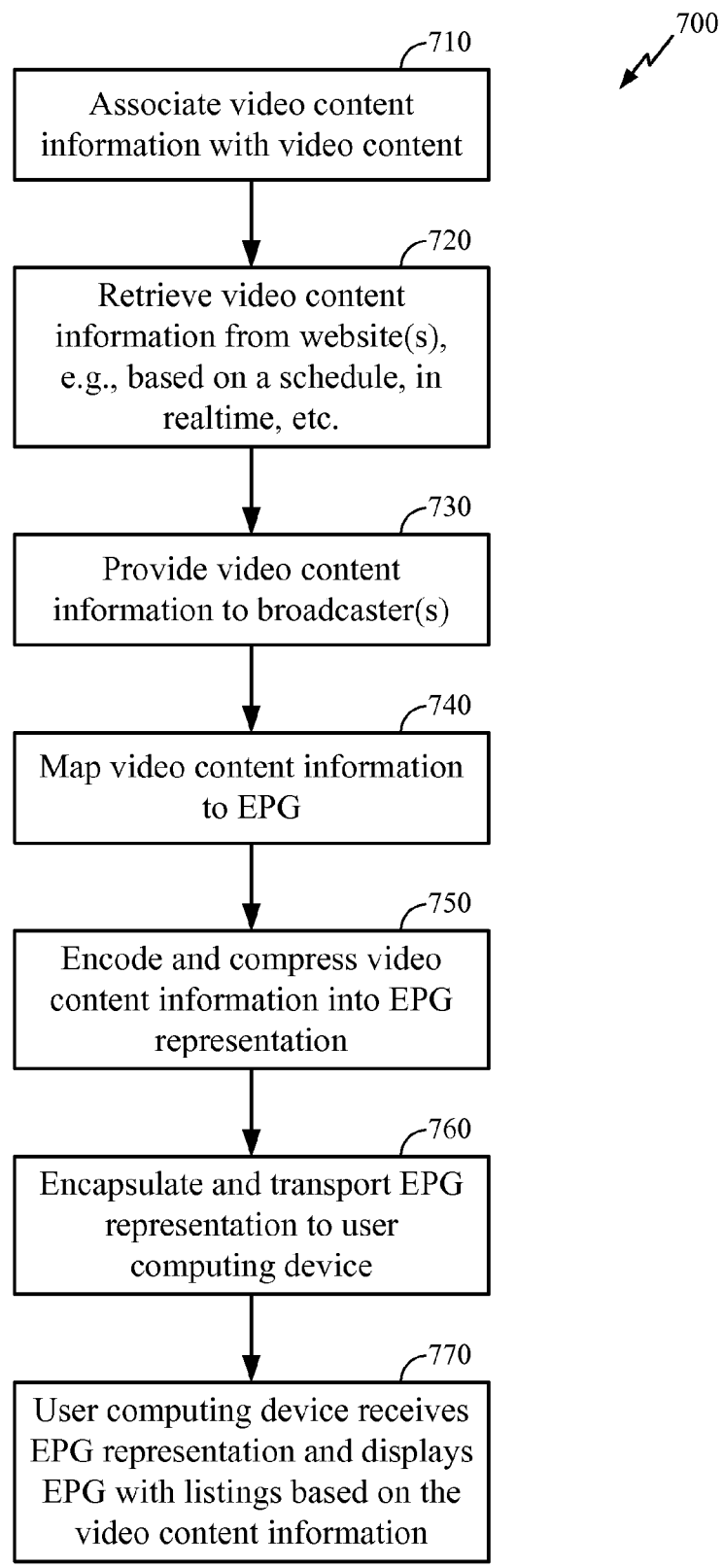
FIG. 7 is an operational flow of an implementation of a method that may be used to populate or update an EPG on a user computing device.
Figure 8:
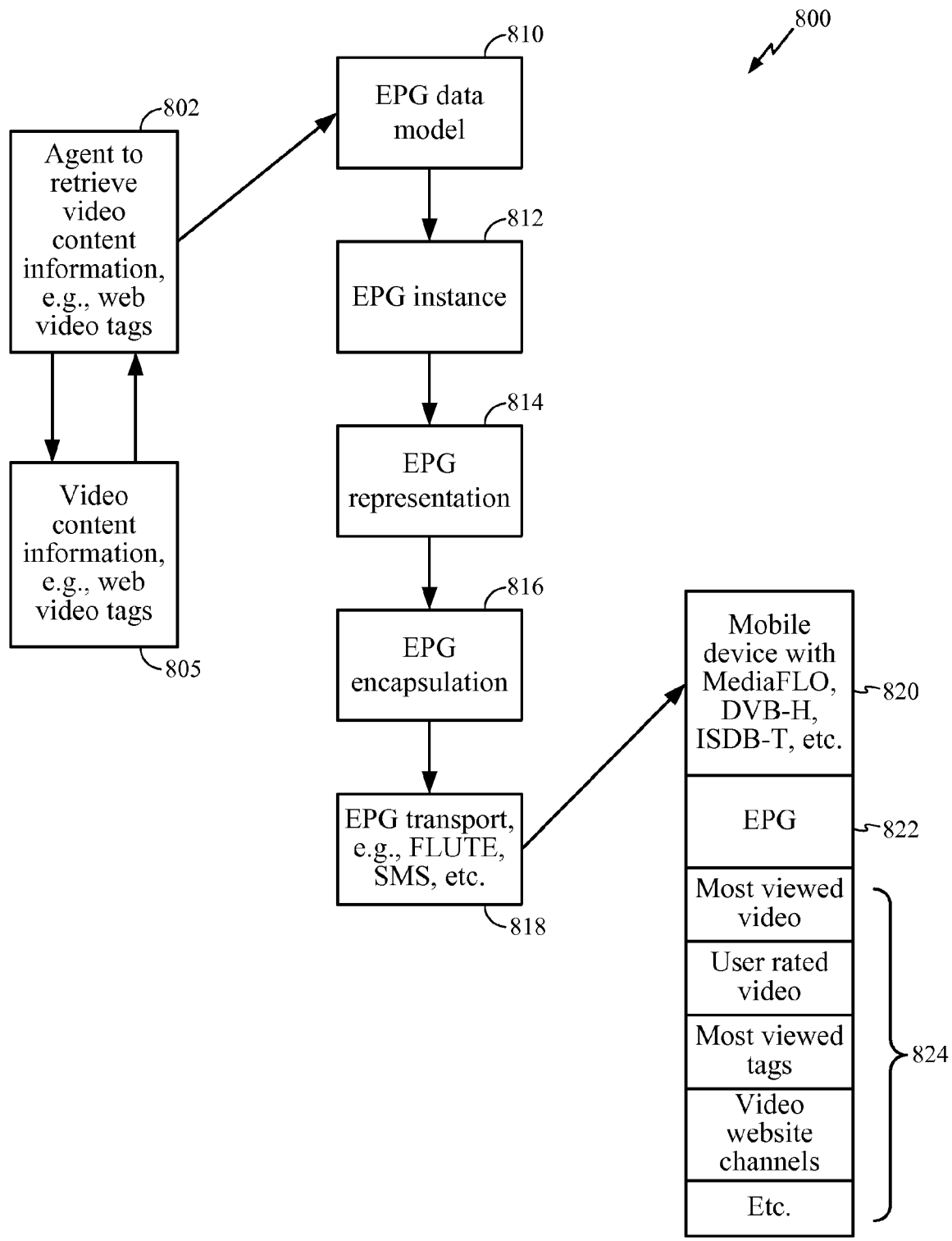
FIG. 8 is a block diagram of an implementation of an environment for video tag mapping to an EPG.

FIG. 7 is an operational flow of an implementation of a method 700 that may be used to populate or update an EPG on a user computing device. FIG. 8 is a block diagram of an implementation of an environment 800 for video tag mapping to an EPG, such as that which may be used in conjunction with FIG. 7. At operation 710, video content information, such as one or more video tags or other information such as category, may be associated with video content that is available from a website. The association may be made by a user who provides the video content to the website or by the entity that owns or maintains the website, for example.

At operation 720, an agent 802 such as an application or video search engine, may retrieve video content information 805, such as video tags or categories, of available video content from one or more websites. Retrieval of video content information may be performed based upon a schedule (e.g., every day at 11 p.m., every 15 minutes, etc.), in realtime, for example. The video content information may be directed to premium content, user content, or both. Both premium content and user content may be delivered to the user computing device using the same EPG.

The video content information may be provided to one or more broadcasters at operation 730. Alternatively or additionally, a broadcaster may retrieve video content information from one or more websites using its own agent or application.

At operation 740, the video content information may be mapped to the EPG, e.g., by mapping the video content information, such as video tags and/or categories to the leaves or nodes of an EPG data model 810 and then instantiated into an EPG instance 812. The video content information may then be encoded (e.g., into XML) and compressed (e.g., using gzip or BiM) into an EPG representation 814 at operation 750. The EPG representation may be encapsulated 816 and transported 818 to a user computing device such as a mobile device 820 at operation 760. Transporting may be performed by SMS, FLUTE, or any other appropriate file transfer technique or protocol.

At operation 770, the user computing device may receive the transmission, unpack the video content information, and run a script or other application to display the EPG 822 that includes listings 824 based on the newly received video content information. The EPG may be regularly updated by the broadcaster, e.g., with currently available programming, current highest rated video content, current most viewed video content, etc. If the received video content information contains an update to the information to be displayed in the EPG, then the user computing device may run a script or other application to display the updated information in the EPG along with existing information that is not being updated.

An agent, such as agent 802, may act as a scheduler which schedules realtime updates of scheduled broadcasts on the web to an EPG. A website may contain video content information that is updated in realtime. The video content information may be retrieved from a website by the agent, at regularly scheduled times for example (e.g., every day at 11 p.m.), and used to generate or update the EPG with more current listings.

In an implementation, the latest video content on a website may be accessed by an agent or broadcaster, and an EPG may be provided to the user computing device for different categories of videos on the website. The different categories of videos may be mapped to an EPG menu list. The latest video from a selected category may be displayed on the EPG and may be selected by a user for downloading, storage, viewing, etc.

In an implementation, the user may enter into the EPG or other user interface on the computing device a desired video tag directed to video content the user would like to receive or be made aware of as it becomes available. An agent may add the user to a particular IP multicast address group. This may allow the user to receive notice of and view most viewed videos, latest videos, etc. pertaining to the associated video tag from the web on the user computing device. To map video tags to an EPG on a user computing device, the agent may review the video tag information and the user information (e.g., user selections, user location, etc.), and provide the relevant video tags to the broadcaster for display in the EPG.

An agent may produce a broadcast stream based on different desired video tags received from different EPGs. A user may add or remove categories in the EPG corresponding to different video tags. The EPG may be periodically updated with video tags available for viewing. The user may search and select one or more video tags of video content the user wishes to be notified of, download, store, and/or view, for example. Alternatively, the user may provide preferences for certain video tags to the agent or broadcaster. The broadcaster may update the EPG with corresponding matching or related video tags.

Figure 9:
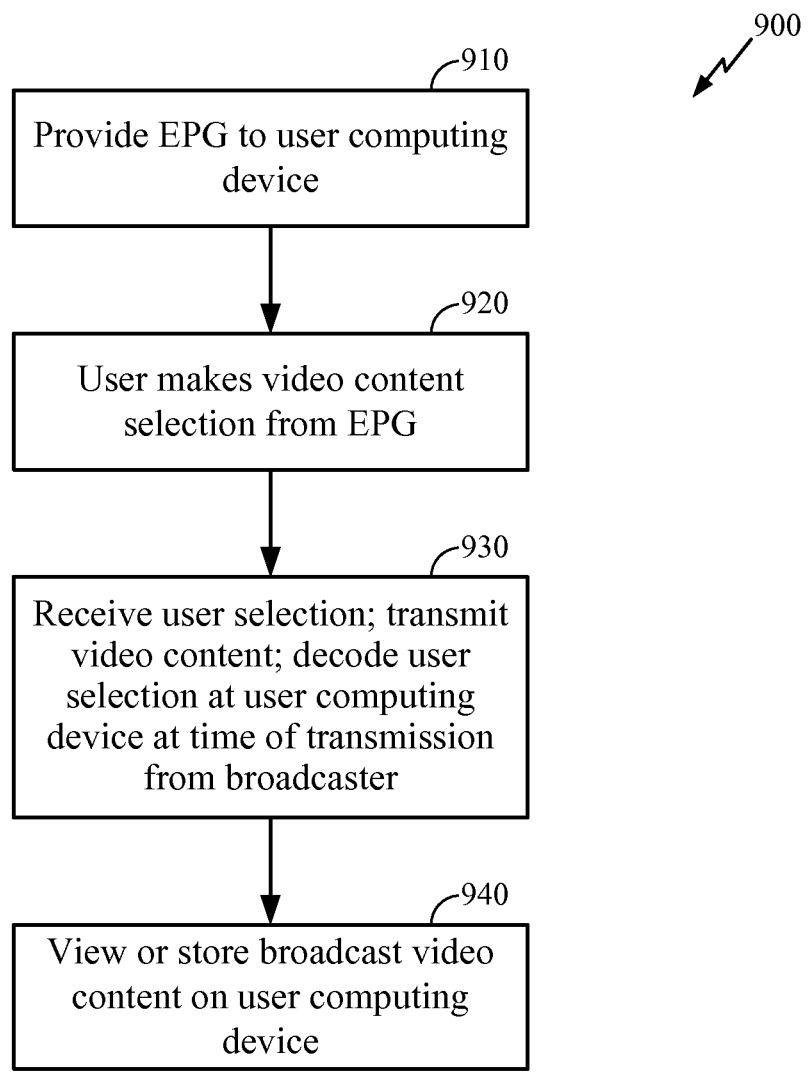
FIG. 9 is an operational flow of an implementation of a method that may be used to deliver video content to a device via an EPG selection.

FIG. 9 is an operational flow of an implementation of a method 900 that may be used to deliver video content via an EPG selection. At operation 910, an EPG may be provided to a user computing device, using a method such as the method 700 described with respect to FIG. 7 for example. At operation 920, the user may make a video content selection from the EPG.

The user selection of the video content may be received, the user selection may be broadcast, and the user computing device may decode the video content pertaining to the video content selection at operation 930. The user computing device may decode a particular transmit stream from the broadcaster that pertains to the selected video content. The user computing device may store or display the decoded broadcast video content at operation 940. The video content may be transmitted to the user computing device using technologies such as IP multicast, along with access technology such as MediaFLO, DVB-H, DMB, ISDB-T, or 3G MBMS or platinum broadcast, for example. Video may be broadcast from an assigned broadcaster, which may buffer and replay video content from a website. Various broadcasters may map to different selectable options (e.g., categories, genres, types, video tags) on an EPG.

In an implementation, a user may select a genre, category, type, or video tag via the EPG, and the latest video content of a website pertaining to the user selection may be continuously broadcast to the user depending on the user's EPG selection.

Thus, a variety of services may be provided including video-on-demand, traditional/linear and live television programs, as well as broadcasts where the video content is delivered to a user computing device on demand or by subscriptions. Stored locally on the user computing device, the video content may be viewed even when there is no network connection. A user or a broadcaster may schedule the delivery to off-peak hours, for example during the night.

Although example implementations described herein may be directed to mobile devices, the disclosure is not limited thereto, and stationary televisions, monitors, and computing devices are contemplated.

Figure 10:
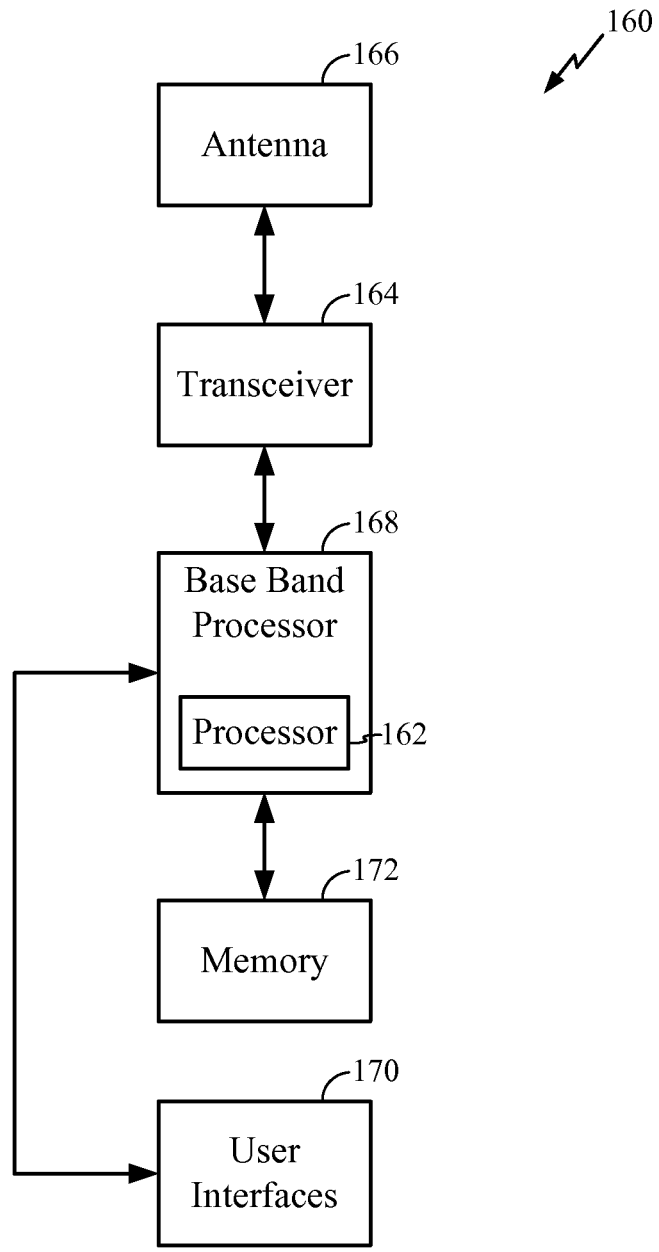
FIG. 10 is a block diagram of a possible configuration of a mobile device.

FIG. 10 is a block diagram of a possible configuration of a user computing device, such as a handset or mobile device 160. As those skilled in the art will appreciate, the precise configuration of the mobile device 160 may vary depending on the specific application and the overall design constraints. Processor 162 can implement the systems and methods disclosed herein.

Mobile device 160 can be implemented with a front-end transceiver 164 coupled to an antenna 166. The front-end transceiver 164 is configured to receive a data communication. A base band processor 168 can be coupled to the transceiver 164. The base band processor 168 can be implemented with a software-based architecture, or other types of architecture. A microprocessor can be utilized as a platform to run software programs that, among other functions, provide control and overall system management function. A digital signal processor (DSP) can be implemented with an embedded communications software layer, which runs application specific algorithms to reduce the processing demands on the microprocessor. The DSP can be utilized to provide various signal processing functions such as pilot signal acquisition, time synchronization, frequency tracking, spread-spectrum processing, modulation and demodulation functions, and forward error correction.

Mobile device 160 can also include various user interfaces 170 coupled to the base band processor 168. User interfaces 170 can include a keypad, mouse, touch screen, display, ringer, vibrator, audio speaker, microphone, camera, and/or other input/output devices.

The base band processor 168 comprises a processor 162. In a software-based implementation of the base band processor 168, the processor may be a software program running on a microprocessor. However, as those skilled in the art will readily appreciate, the processor 162 is not limited to this embodiment, and may be implemented by a variety of means known in the art, including hardware configurations, software configuration, or combination thereof, which is capable of performing the various functions described herein. The processor 162 can be coupled to memory 172 for the storage of data. The memory 172 is configured to store the program data received during a manufacturing and/or test process and the processor 162 or 168 is configured to be programmed with the program data.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

The disclosed embodiments may be applied to any one or combinations of the following technologies: CDMA systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an application specific integrated circuit (ASIC). The ASIC may reside in a user terminal. In the alternative, the processor and the storage medium may reside as discrete components in a user terminal.

It should be noted that the methods described herein may be implemented on a variety of hardware, processors, and systems known by one of ordinary skill in the art. For example, the general requirement for the user computing device to operate as described herein is that the user computing device has a display to display content and information, a processor to control the operation of the user computing device, and a memory for storing data and programs related to the operation of the user computing device. In some embodiments, the user computing device is a mobile phone. In some embodiments, the user computing device is a handheld computer having communications capabilities. In yet another embodiment, the user computing device is a personal computer having communications capabilities. Further, although terms such as "client" and "server" has been used herein to refer to specific devices and/or entities, these terms should not be construed to be limiting in anyway but are used to provide a clearer explanation of the embodiments contained herein. Thus, a device or entity that is a "client" in one sequence of transaction or scenario may be considered a "server" in another sequence of transactions or scenario.

The various illustrative logics, logical blocks, modules, and circuits described in connection with the embodiments disclosed herein may be implemented or performed with a general purpose processor, a DSP, an ASIC, a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method comprising:

receiving a plurality of video content information from a plurality of websites comprising at least one premium content website and at least one user content website, each of the plurality of websites for providing a plurality of video content simultaneously in a same scheduled time slot, the plurality of video content information associated with the plurality of video content available from the plurality of websites, wherein the plurality of video content information comprises rating information received from other users for the plurality of video content, wherein the plurality of video content for the at least one premium content website comprises premium content and the plurality of video content for the at least one user content website comprises user content, the premium content being generated by a broadcaster of video content and the user content being generated by a user of the plurality of websites; and arranging listing information of the plurality of video content available from the plurality of websites for an electronic program guide (EPG) for display on a user computing device based on the rating information received from the other users for the plurality of video content information, user interaction with at least one of the plurality of video content, and time when the at least one of the plurality of video content was posted to the plurality of websites, and enabling the user computing device to combine a plurality of user-selection criteria to display focused listing information, that meet the user-selection criteria, simultaneously in the EPG, wherein at least one agent aggregates the video content information and video content from at least one website of the plurality of websites, sends the video content information and video content to at least one broadcaster for delivery to the user computing device, and produces a broadcast stream of available video content notice based on different user-selection criteria received from different EPGs, wherein the at least one agent operates separately from the at least one broadcaster, and wherein the at least one broadcaster operates separately from at least one network over which the user computing device receives the video content information and video content.

2. The method of claim 1, wherein the video content information comprises at least one of a video tag, a category, a broadcast time, or a type of an associated one of the video content.

3. The method of claim 1, wherein the plurality of video content information comprises local video content information and national video content information or global video content information, and further comprising aggregating the local video content information and the national video content information or the global video content information prior to arranging the listing information.

4. The method of claim 1, wherein arranging the listing information for the EPG to the user computing device comprises providing the listing information via short message service (SMS) or file delivery over unidirectional transport (FLUTE) protocol.

5. The method of claim 1, wherein the rating information received from the other users reflects the opinion of the other users regarding the plurality of video content.

6. The method of claim 1, wherein the rating information is provided by the other users after viewing at least a portion of the video content by inputting their rating using a user interface device.

7. The method of claim 1, wherein the plurality of video content information comprises providing an indicator for indicating that the plurality of video content was recently made available on the website.

8. The method of claim 1, wherein the plurality of video content information includes a video description term that may be received for each one of the plurality of video content by the other users that uploaded the plurality of video content to the plurality of websites.

9. The method of claim 1, further comprising:
arranging at least some of the plurality of video content from the plurality of websites into a video stream, for display on the user computing device, based on a selected category received from the user computing device.

10. The method of claim 9, wherein the video stream includes video content from at least two different websites of the plurality of websites.

11. The method of claim 1, further comprising,
broadcasting a selected one of the plurality of video content using a broadcast technology via comprising at least one of MediaFLO, digital video broadcasting —handheld (DVBH), integrated services digital broadcasting — terrestrial (ISDB-T), third generation multimedia broadcast and multicast service (3G MBMS), platinum broadcast, and internet protocol (IP) multicast.

12. The method of claim 1,
wherein the plurality of video content information comprises a plurality of categories;
the method further comprising:
receiving a selected category of the plurality of categories from the user computing device;
wherein the listing information of the plurality of video content for the EPG is arranged based on the selected category.

13. The method of claim 1, wherein at least one of the plurality of websites for providing both at least some premium content and at least some user content.

14. The method of claim 1, wherein the plurality of video content for the at least one user content website is providable by the at least one user content website at the same time.

15. A non-transitory computer-readable medium comprising computer-readable instructions, said computer-readable instructions comprising instructions that:
receive a plurality of video content information from a plurality of websites comprising at least one premium content website and at least one user content website, each of the plurality of websites for providing a plurality of video content simultaneously in a same scheduled time slot, the plurality of video content information associated with the plurality of video content available from the plurality of websites, the plurality of video content for the at least one premium content website comprising premium content and the plurality of video content for the at least one user content website comprises user content, the premium content being generated by a broadcaster of video content and the user content being generated by a user of the plurality of websites, and the plurality of video content information further comprising rating information received from other users for the plurality of video content available from the plurality of websites;

arrange listing information of the plurality of video content available from the plurality of websites for an electronic program guide (EPG) for display on a user computing device based on the rating information received from the other users for the plurality of video content information, user interaction with at least one of the plurality of video content, and time when the at least one of the plurality of video content was posted to the plurality of websites, and enabling the user computing device to combine a plurality of user-selection criteria to display focused listing information, that meet the user-selection criteria, simultaneously in the EPG; and cause at least one agent to aggregate the video content information and video content from at least one website of the plurality of websites, sends the video content information and video content to at least one broadcaster for delivery to the user computing device, and produces a broadcast stream of available video content notice based on different user-selection criteria received from different EPGs, wherein the at least one agent operates separately from the at least one broadcaster, and wherein the at least one broadcaster operates separately from at least one network over which the user computing device receives the video content information and video content.

16. The non-transitory computer-readable medium of claim 15, wherein the video content information comprises at least one of a video tag, a category, a broadcast time, or a type of an associated one of the video content.

17. The non-transitory computer-readable medium of claim 15, wherein the instructions that provide the listing information for the EPG comprise instructions that map the premium content and the user content to the EPG.

18. The non-transitory computer-readable medium of claim 15, further comprising instructions that:
receive a user selection for a selected one of the plurality of video content; and
broadcast the selected one of the plurality of video content to the user computing device.

19. The non-transitory computer-readable medium of claim 18, wherein the instructions that provide the listing information for the EPG to the user computing device comprises instructions that provide the listing information via short message service (SMS) or file delivery over unidirectional transport (FLUTE) protocol, and wherein the instructions that broadcast the selected one of the plurality of video content comprises instructions that broadcast using a broadcast technology comprising at least one of MediaFLO, digital video broadcasting handheld (DVB-H), integrated services digital broadcasting-terrestrial (ISDB-T), third generation multimedia broadcast and multicast service (3G MBMS), platinum broadcast, and internet protocol (IP) multicast.

20. An apparatus comprising:
means for receiving a plurality of video content information from a plurality of websites comprising at least one premium content website and at least one user content website, each of the plurality of websites for providing a plurality of video content simultaneously in a same scheduled time slot, the plurality of video content information associated with the plurality of video content available from the plurality of websites, and the plurality of video content information comprising rating information received from other users for the plurality of video content available from the plurality of websites, wherein the plurality of video content comprising at least one premium content website and at least one user content website comprises premium content and the plurality of video content for the at least one user content website comprises user content, the premium content being generated by a broadcaster of video content and the user content being generated by a user of the plurality of websites; and means for arranging listing information of the plurality of video content available from the plurality of websites for an electronic program guide (EPG) for display on a user computing device based on the rating information received from the other users for the plurality of video content information, user interaction with at least one of the plurality of video content, and time when the at least one of the plurality of video content was posted to the plurality of websites, and enabling the user computing device to combine a plurality of user-selection criteria to display focused listing information, that meet the user-selection criteria, simultaneously in the EPG, wherein the apparatus is configured to receive the video content information and video content from at least one website of the plurality of websites aggregated by and received from at least one agent and to deliver the video content information and video content to at least one broadcaster for delivery to the user computing device, the at least one agent producing a broadcast stream of available video content notice based on different user-selection criteria received from different EPGs, wherein the at least one agent operates separately from the at least one broadcaster, and wherein the at least one broadcaster operates separately from at least one network over which the user computing device receives the video content information and video content.

21. The apparatus of claim 20, wherein the video content information comprises at least one of a video tag, a category, a broadcast time, or a type of an associated one of the video content and wherein the plurality of video content comprises at least one of premium content or user content.

22. The apparatus of claim 20, wherein the means for receiving the plurality of video content information from the plurality of websites comprises means for receiving the plurality of video content information from an agent associated with the plurality of websites or a broadcaster.

23. The apparatus of claim 22, wherein the means for receiving the plurality of video content information from the agent comprises means for scheduling a realtime retrieval of the plurality of video content information from the plurality of websites.

24. The apparatus of claim 20, wherein the means for the listing information for the EPG to the user computing device comprises means for providing the listing information via short message service (SMS) or file delivery over unidirectional transport (FLUTE) protocol, and further comprising means for broadcasting the selected one of the plurality of video content using a broadcast technology comprising at least one of MediaFLO, digital video broadcasting —handheld (DVB-H), integrated services digital broad casting terrestrial (ISDB-T), third generation multimedia broadcast and multicast service (3G MBMS), platinum broadcast, and internet protocol (IP) multicast.

25. An apparatus comprising:
at least one processor configured to receive a plurality of video content information from a plurality of websites comprising at least one premium content website and at least one user content website, each of the plurality of websites for providing a plurality of video content simultaneously in a same scheduled time slot, the plurality of video content information associated with the plurality of video content available from the plurality of websites, the plurality of video content information further comprising rating information received from other users for the plurality of video content, wherein the plurality of video content for the at least one premium content website comprises premium content and the plurality of video content for the at least one user content website comprises user content, the premium content being generated by a broadcaster of video content and the user content being generated by a user of the plurality of websites available from the plurality of websites, and to arrange listing information of the plurality of video content available from the plurality of websites for an electronic program guide (EPG) for display on a user computing device based on the rating information received from the other users for the plurality of video content information, user interaction with at least one of the plurality of video content, and time when the at least one of the plurality of video content was posted to the plurality of websites, and enabling the user computing device to combine a plurality of user-selection criteria to display focused listing information, that meet the user-selection criteria, simultaneously in the EPG; and
a memory coupled to the at least one processor,
wherein the apparatus is configured to receive the video content information and video content from at least one website of the plurality of websites aggregated by and received from at least one agent and to deliver the video content information and video content to the user computing device, the at least one agent producing a broadcast stream of available video content notice based on different user-selection criteria received from different EPGs, wherein the at least one agent operates separately from the broadcaster, and wherein the broadcaster operates separately from at least one network over which the user computing device receives the video content information and video content.

26. The apparatus of claim 25, wherein the video content information comprises at least one of a video tag, a category, a broadcast time, or a type of an associated one of the video content.

27. The apparatus of claim 25, wherein the at least one processor is configured to receive the plurality of video content information from an agent associated with the plurality of websites or a broadcaster.

28. The apparatus of claim 25, wherein the at least one processor is configured to receive a user selection for a selected one of the plurality of video content, and to broadcast the selected one of the plurality of video content to the user computing device.

29. The apparatus of claim 28, wherein the at least one processor is configured to provide the listing information via short message service (SMS) or file delivery over unidirectional transport (FLUTE) protocol, and to broadcast the selected one of the plurality of video content using a broadcast technology comprising at least one of MediaFLO, digital video broadcasting —handheld (DVB-H), integrated services digital broadcasting — terrestrial (ISDBT), third generation multimedia broadcast and multicast service (3G MBMS), platinum broadcast, and internet protocol (IP) multicast.

30. An apparatus comprising:
at least one processor configured to receive listing information from a plurality of websites comprising at least one premium content website and at least one user content website, each of the plurality of websites for providing a plurality of video content simultaneously in a same scheduled time slot, a plurality of video content information associated with the plurality of video content available from the plurality of websites, wherein the plurality of video content information comprises rating information received from other users for the plurality of video content, wherein the plurality of video content comprising at least one premium content website and at least one user content website comprises premium content and the plurality of video content for the at least one user content website comprises user content, the premium content being generated by a broadcaster of video content and the user content being generated by a user of the plurality of websites;

the processor configured to arrange the listing information of the plurality of video content available from the plurality of websites for an electronic program guide (EPG) for display on a user computing device based on user interaction with at least one of the plurality of video content, and a time when the at least one of the plurality of video content was posted to the plurality of websites and the rating information received from the other users for the plurality of video content available from the plurality of websites, and further configured to enable the user computing device to combine a plurality of user-selection criteria to display focused listing information, that meet the user-selection criteria, simultaneously in the EPG;

a user interface that displays the EPG comprising a plurality of listings based on the rating information; and a memory coupled to the at least one processor, wherein the apparatus is configured to receive the video content information and video content from at least one website of the plurality of websites aggregated by and received from at least one agent, the at least one agent producing a broadcast stream of available video content notice based on different desired user-selection criteria received from different EPGs, wherein the at least one agent operates separately from at least one broadcaster, and wherein the at least one broadcaster operates separately from at least one network over which the user computing device receives the video content information and video content.

31. The apparatus of claim 30, wherein the video content information comprises at least one of a video tag, a category, a broadcast time, or a type of associated video content.

32. The apparatus of claim 30, wherein the user interface is configured to receive a user selection of one of the plurality of listings to play, store, or set a reminder for premium content or user content associated with the one of the plurality of listings.

33. The apparatus of claim 30, wherein the apparatus comprises a handset or mobile device.

34. The apparatus of claim 30, wherein the apparatus comprises an integrated circuit.

35. A method, comprising:
receiving a plurality of video content information from a plurality of websites comprising at least one premium content website and at least one user content website, each of the plurality of websites for providing a plurality of video content simultaneously in a same scheduled time slot, the plurality of video content information associated with the plurality of video content available from the plurality of websites, wherein the plurality of video content information comprises a plurality of categories, wherein the plurality of video content for the at least one premium content website comprises premium content and the plurality of video content for the at least one user content website comprises user content, the premium content being generated by a broadcaster of video content and the user content being generated by a user of the plurality of websites;

receiving a selected category of the plurality of categories from a user computing device; and arranging listing information of the plurality of video content available from the plurality of websites for an electronic program guide (EPG) for display on the user computing device based on the selected category, user interaction with at least one of the plurality of video content, and a time when the at least one of the plurality of video content was posted to the plurality of websites, and enabling the user computing device to combine a plurality of user-selection criteria to display focused listing information, that meet the user-selection criteria, simultaneously in the EPG, wherein at least one agent aggregates the video content information and video content from at least one website of the plurality of websites, sends the video content information and video content to at least one broadcaster for delivery to the user computing device, and produces a broadcast stream of available video content notice based on different user-selection criteria received from different EPGs, wherein the at least one agent operates separately from the at least one broadcaster, and wherein the at least one broadcaster operates separately from at least one network over which the user computing device receives the video content information and video content.

36. A method comprising:
receiving a plurality of video content information from at least one website of a plurality of websites, the video content information associated with a plurality of video content available from the at least one website, wherein the video content information comprises at least one video tag, the at least one video tag being provided by either the at least one website or a first user, wherein the plurality of video content further comprises premium content and user content, the premium content being generated by a broadcaster of the video content and the user content being generated by a user of the at least one website; and providing listing information of the plurality of video content available from the at least one website for an electronic program guide (EPG) to a user computing device of a second user based on rating information for the video content information, user interaction with at least one of the plurality of video content, and a time when the at least one of the plurality of video content was posted to the plurality of websites, and enabling the user computing device to combine a plurality of user-selection criteria to display focused listing information, that meet the user-selection criteria, simultaneously in the EPG, wherein one or more agents aggregate the video content information and video content from at least one website of the plurality of websites and send the video content and video content information to one or more broadcasters for delivery to the user computing device, wherein at least one of the one or more agents produces a broadcast stream of available video content notice based on different video tags received from different EPGs, wherein the at least one agent operates separately from the one or more broadcasters, and wherein the one or more broadcasters operate separately from at least one network over which the user computing device receives the video content information and video content.

37. The method of claim 36, wherein each of the video content information further comprises at least one of a category, a broadcast time, or a type of an associated one of the video content, information based on user interaction with the associated one of the video content, or information based on when the associated one of the video content was posted to the website.

38. The method of claim 36, wherein the plurality of video content information further comprises local video content information and national video content information or global video content information, and further comprising aggregating the local video content information and the national video content information or the global video content information prior to providing the listing information.

39. The method of claim 36, further comprising mapping the premium content and the user content to the EPG.

40. An apparatus comprising:
means for receiving a plurality of video content information from at least one website of a plurality of websites, the video content information associated with a plurality of video content available from the at least one website, wherein the video content information comprises at least one video tag, the at least one video tag being provided by either the at least one website or a first user, wherein the plurality of video content further comprises premium content and user content, the premium content being generated by a broadcaster of the video content and the user content being generated by a user of the at least one website; and
means for providing listing information of the plurality of video content available from the at least one website for an electronic program guide (EPG) to a user computing device of a second user based on rating information for the video content information, user interaction with at least one of the plurality of video content, and a time when the at least one of the plurality of video content was posted to the plurality of websites, and enabling the user computing device to combine a plurality of user-selection criteria to display focused listing information, that meet the user-selection criteria, simultaneously in the EPG,
wherein the apparatus is configured to receive the video content information and video content from the at least one website of the plurality of websites aggregated by and received from one or more agents and to deliver the video content and video content information to the user computing device, wherein at least one of the one or more agents produces a broadcast stream of available video content notice based on different video tags received from different EPGs, wherein the at least one agent operates separately from at least one broadcaster, and wherein the at least one broadcaster operates separately from at least one network over which the user computing device receives the video content information and video content.

41. The apparatus of claim 40, wherein each of the video content information comprises at least one of a category, a broadcast time, or a type of an associated one of the video content, information based on user interaction with the associated one of the video content, or information based on when the associated one of the video content was posted to the website, and wherein the plurality of video content comprises at least one of premium content or user content.

42. The apparatus of claim 40, wherein the means for receiving the plurality of video content information from the at least one website comprises means for receiving the plurality of video content information from an agent associated with the at least one website or a broadcaster.

43. The apparatus of claim 42, wherein the means for receiving the plurality of video content information from the agent comprises means for scheduling a realtime retrieval of the plurality of video content information from the at least one website.

44. The apparatus of claim 40, wherein the means for receiving a plurality of video content information from at least one website comprises:
at least one processor configured to receive the plurality of video content information from at least one website, the video content information associated with a plurality of video content available from the at least one website, wherein the video content information comprises at least one video tag, the at least one video tag being provided by either the at least one website or the first user, and to provide listing information for the EPG to the user computing device of a second user based on the video content information; and
a memory coupled to the at least one processor.

45. The apparatus of claim 44, wherein the at least one processor is further configured to receive the plurality of video content information from an agent associated with the at least one website or a broadcaster.

46. The apparatus of claim 44, wherein the at least one processor is further configured to receive a user selection for a selected one of the plurality of video content, and to broadcast the selected one of the plurality of video content to the user computing device.

\* \* \* \* \*